United States Patent [19]
Edwards

[11] 3,985,966

[45] Oct. 12, 1976

[54] METHOD AND APPARATUS FOR GENERATING DIGITAL DUAL FREQUENCY SIGNALS

[75] Inventor: John D. Edwards, Campbell, Calif.

[73] Assignee: Rolm Corporation, Cupertino, Calif.

[22] Filed: July 23, 1975

[21] Appl. No.: 598,291

[52] U.S. Cl. ............................... 179/15 BY; 328/14
[51] Int. Cl.² ...................... H04J 3/00; H03B 19/00
[58] Field of Search ................. 340/347 SY; 328/14; 318/604, 605; 325/38 R; 179/18 J, 15 BY, 15 AT

*Primary Examiner*—Thomas A. Robinson
*Attorney, Agent, or Firm*—Townsend and Townsend

[57] ABSTRACT

A dual tone multiple frequency digital tone generator for a PCM/TDM electronic telephone system. A digital representation of a dual tone signal is generated from a multi-bit command character by determining the phase angle of two frequencies specified by the command character relative to an independent time reference signal, converting paired phase angles to amplitude signals representative of the amplitude of a sine wave having each calculated phase angle, and summing the amplitude representations to generate a value corresponding to the digital representation of the frequency pair at that particular instant. Individual phase angles are calculated by generating a multi-bit digital character corresponding to the phase angle of a sinusoidal reference signal of the particular frequency. This character is preferably generated by multiplying a multi-bit digital character having $n$-bits representing the fractional part of the number of seconds elapsed from some reference time by a multi-bit digital character having $m$ bits representing the frequency of the sinusoidal signal, $m$ and $n$ both integers. The resulting $m + n$ bit product consisting of an $m$-bit integral part and an $n$-bit fractional part is examined and the $p$ most significant bits to the right of the decimal point are selected, $p$ being an integer. The value of $n$ determines the accuracy of the product relative to the absolute value of the phase angle, while the value of $p$ determines the resolution of the phase angle representation. Both $n$ and $p$ are preselected in accordance with the required accuracy of the frequency representation.

12 Claims, 13 Drawing Figures

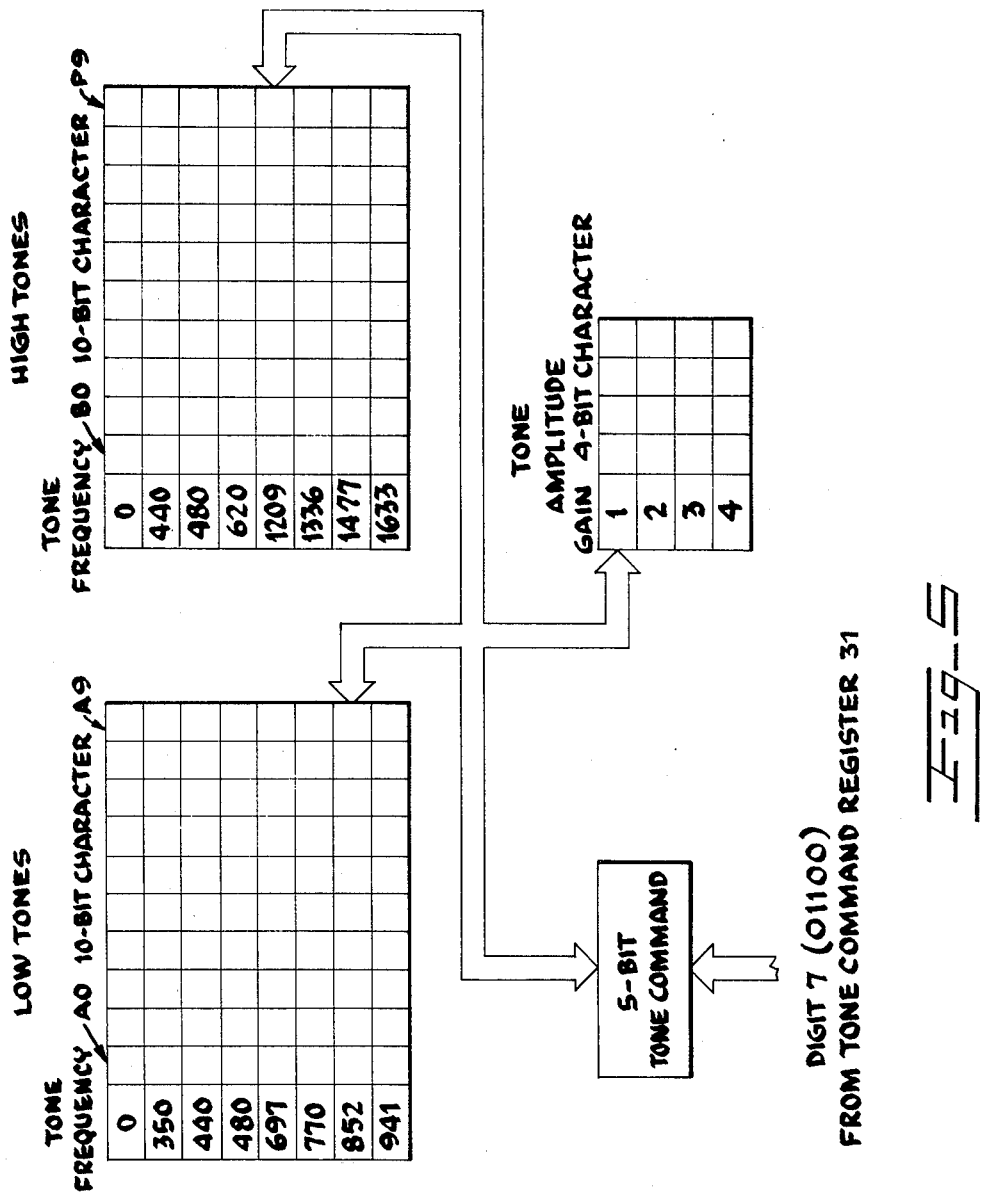

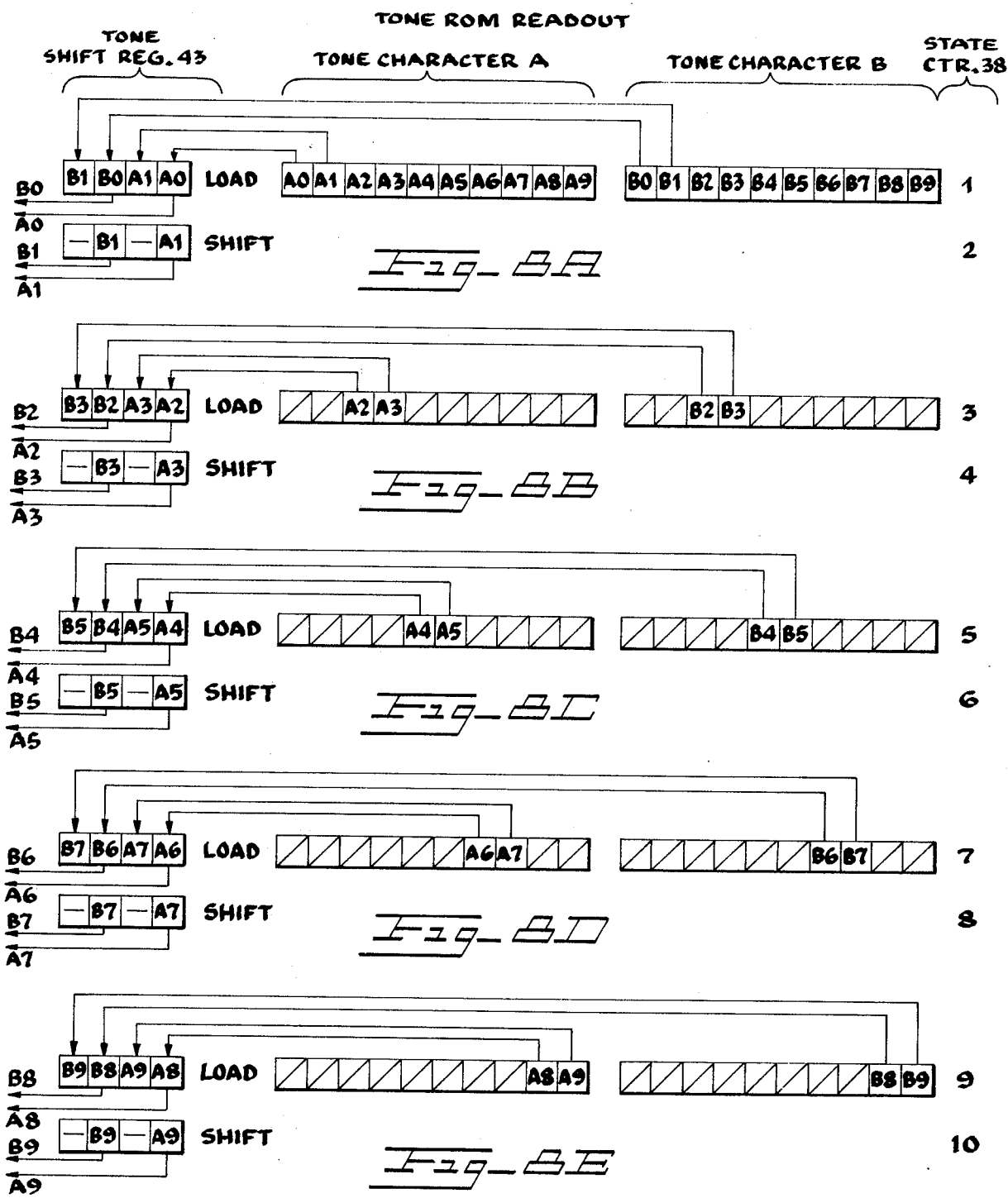

METHOD AND APPARATUS FOR GENERATING DIGITAL DUAL FREQUENCY SIGNALS

BACKGROUND OF THE INVENTION

This invention relates to digital electronic signaling systems. More particularly, this invention relates to digital systems for generating dual frequency tone signals in time division multiplexed telephone systems.

With the advent of pulse code modulated time division multiplexed (PCM/TDM) telephone systems, such as the EPABX manufactured and sold by the ROLM Corporation of Cupertino, California the need has arisen for an all digital dual frequency tone generator for generating dual tone multifrequency (DTMF) signals in all digital form representative of the digits 0–9, internal and external dial tone, busy signal, and other arbitrary DTMF command signals, e.g., *, # , etc. In the past, attempts have been made to generate such all digital signals by first generating the analog equivalent signal and then digitizing the analog signals in conventional fashion. This technique suffers from the disadvantage of being relatively expensive to implement and relatively unreliable in performance due in part to the opportunity for injection of switching noise into the signals. Accordingly, recent efforts have been directed toward devising an all digital system for generating DTMF signals.

U.S. Pat. No. 3,706,855 illustrates one solution to the problem of generating all digital DTMF signals. However, this solution is limited to those dual frequency signals in which the phase difference between the two basic frequencies of a tone pair is always constant, i.e., to those pairs of tone frequencies which are harmonically related so that mixed pairs of signals are both periodic and symmetric. Although the all-digital DTMF tone generator described in this patent does provide useful results and eliminates the necessity for much analog equipment, the requirement that the DTMF signals be harmonically related in the manner noted above unduly limits the application of the system.

SUMMARY OF THE INVENTION

The invention comprises a dual tone multiple frequency digital tone generator for a PCM/TDM electronic telephone system which is low in cost, reliable in operation and capable of generating digital representations of both harmonically and anharmonically related DTMF signals in response to commands therefor.

In the broadest aspect, the invention comprises the generation of a digital representation of a dual tone signal by determining the phase angle of both frequencies relative to an independent time reference signal, converting the phase angles to amplitude signals representative of the amplitude of a sine wave having each calculated phase angle, and summing the amplitude representations to generate a value corresponding to the digital representation of the frequency pair at that particular instant. By successively calculating the individual phase angles of the individual signals, converting these phase angles to amplitude representations, and summing the amplitude representations in digital form, the desired digital representation of the dual frequency signals may be obtained.

The individual phase angles are calculated by generating a multi-bit digital character corresponding to the phase angle of a sinusoidal reference signal of each frequency. This character is preferably generated by multiplying a multi-bit digital character having $n$-bits representing the fractional part of the number of seconds elapsed from some reference time by a multi-bit digital character having $m$ bits representing the frequency of the sinusoidal signal, $m$ and $n$ both integers. The resulting $m + n$ bit product consisting of an $m$-bit integral part and an $n$-bit fractional part is examined and the $p$ most significant bits to the right of the decimal point are selected. The value of $n$ determines the accuracy of the product relative to the true valve of the phase angle, while the valve of $p$ determines the resolution of the phase angle representation. Both $n$ and $p$ are selected in accordance with the required accuracy of the frequency representation. In the preferred embodiment, straight binary multiplication is employed and selection of the $p$ most significant bits is performed electronically.

After the $p$-bit phase character has been generated, this character is input to a read-only memory in which a set of multi-bit amplitude characters each representative of the amplitude of a periodic wave having a different phase angle is stored. The amplitude character corresponding to the input phase character is read out in response to the receipt of the input character, and this amplitude character is representative of the amplitude of a particular tone at that particular phase angle. Each successive pair of amplitude characters output from the read-only memory are added to generate a resultant digital character representative of the amplitude of a pair of summed periodic waves of the two chosen frequencies.

For a fuller understanding of the nature and advantages of the invention, reference should be had to the ensuing detailed description taken in conjunction with the accompanying drawings.

BRIEF DESCRIPTION OF THE DRAWINGS

FIG. 5 is a schematic diagram illustrating the internal arrangement of tone ROM 41;

FIGS. 8A–8E are schematic diagrams illustrating the multiplication sequence.

DESCRIPTION OF THE PREFERRED EMBODIMENT

Figure 1A:
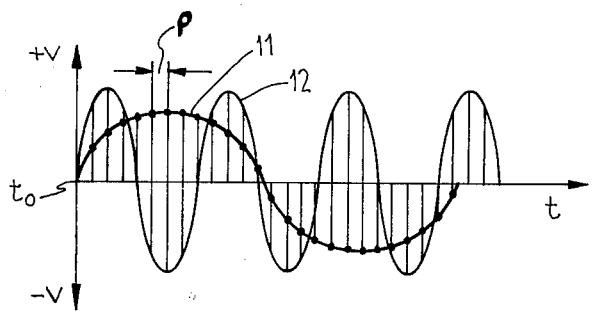
FIGS. 1A and B are schematic diagrams illustrating the principle of the invention.
Figure 1B:
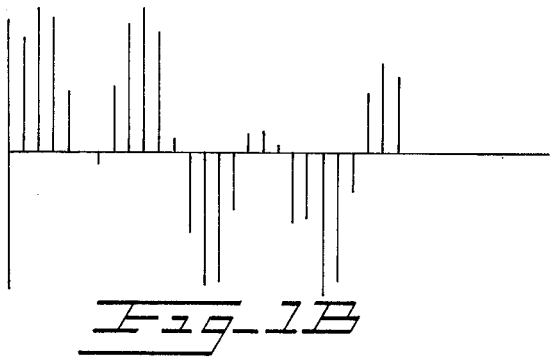

Turning now to the drawings, FIG. 1A illustrates a pair of periodic analog signals 11, 12 representative of a dual frequency signal, while FIG. 1B illustrates a digital equivalent of the signal pair of FIG. 1A. The FIG. 1B equivalent signal is obtained by sampling each wave form 11, 12 of FIG. 1A at predetermined regularly repeated intervals and summing the amplitude of the two wave forms 11, 12 at the sampling point. The digital wave form of FIG. 1B may then be converted into a sequential set of multi-bit digital characters, each multi-bit character representing one of the sampling points, with the number of bits per character depending on the degree of resolution required for a particular system application.

Figure 2:
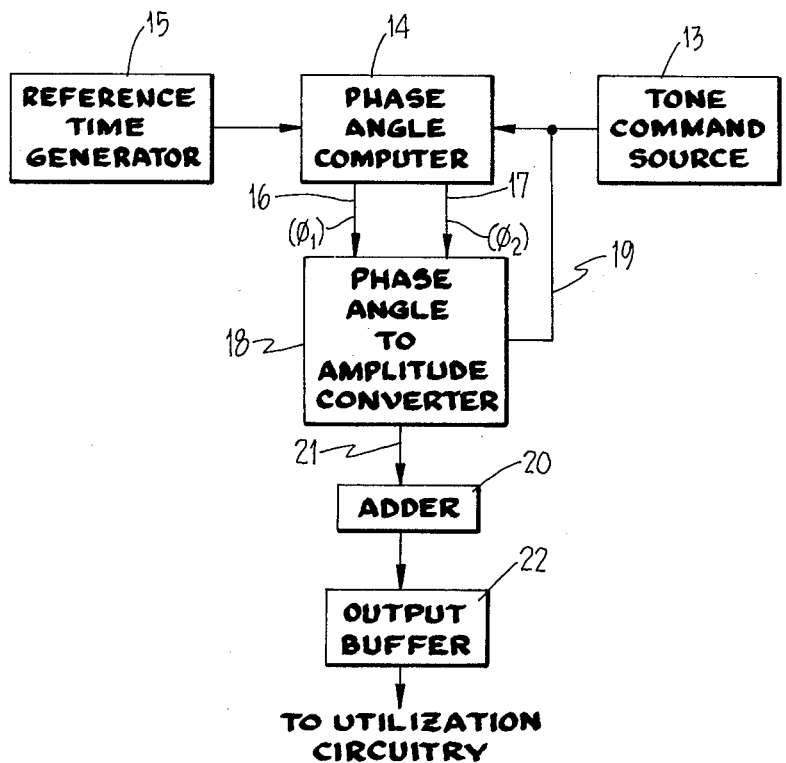
FIG. 2 is a schematic block diagram illustrating the invention.

According to the invention, such a train of multi-bit digital characters is generated in the following manner. With reference to FIG. 2, a multi-bit digital character representing a given dual frequency analog tone signal is supplied from a tone command source 13 to a phase angle computer 14 together with a multi-bit digital character supplied by a reference time generator 15, the latter character representing the elapsed fractional portion of a standard time period at the instant the tone character is clocked into the phase angle computer 14. The phase angle computer 14 successively calculates in digital multi-bit form the phase angle of each of the two single frequency signals comprising the dual frequency tone specified by the tone command source 13. Each pair of digital phase angle characters is coupled via separate data busses 16, 17 to a phase angle to amplitude converter 18 along with a digital amplitude character via bus 19 from the tone command source 13. The phase angle to amplitude converter 18 comprises a memory for storing one or more sets of digital characters each representing the amplitude of a periodic wave having a different phase angle in the range from 0°–360°, with different sets having different predetermined amplitude scales. In response to the receipt of each digital phase angle character and a digital amplitude character, converter 18 performs a table lookup of the relative amplitude of a periodic signal having the specified phase angle and the desired amplitude and generates successive multi-bit characters each representative of the specified relative amplitude. The relative amplitude characters are coupled to an adder 20 via a data bus 21 in which each pair of characters are summed. The output of adder 20, which is a multi-bit digital character representative of the correct amplitude of the dual frequency tone, is temporarily stored in a buffer register 22 and coupled to associated utilization circuitry.

Figure 3:
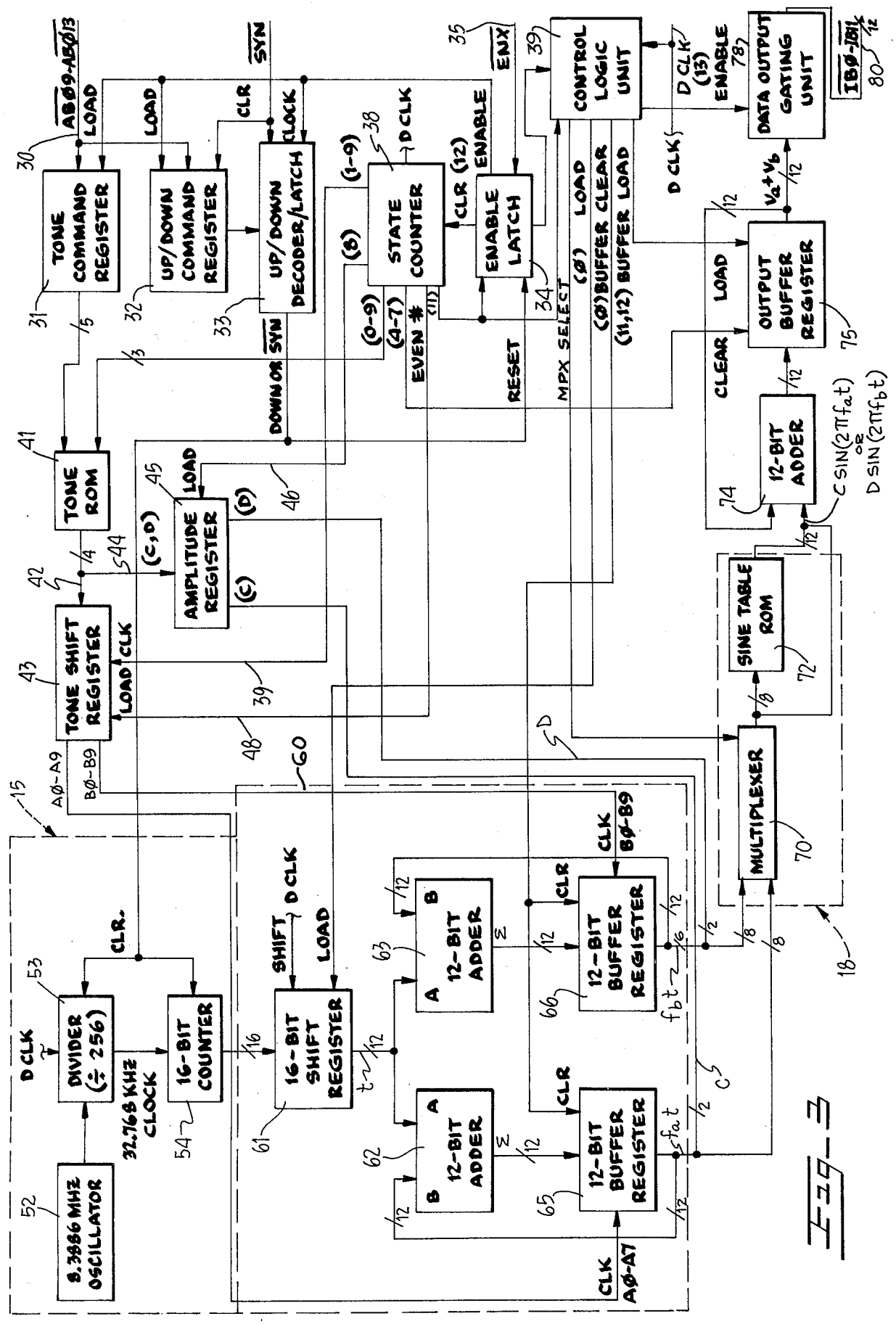
FIG. 3 is a block diagram of the preferred embodiment of the invention.

FIG. 3 is a block diagram of the preferred embodiment of the invention suitable for use in a PCM/TDM electronic digital telephone switchboard. Digital tone command characters are supplied from an associated device via an input bus 30 to a tone command register 31 and also to an up/dowm command register 32. In the preferred embodiment, the tone commands and the up and down commands are 5 bit digital characters as shown in the table 1 below.

TABLE I

| TONE COMMAND | | | | | OPERATION | DUAL TONE FREQUENCIES | |
|---|---|---|---|---|---|---|---|
| | | | | | | LOW | HIGH |
| 0 | 0 | 0 | 0 | 1 | DOWN | — | — |
| 0 | 0 | 0 | 1 | 1 | UP | — | — |
| 0 | 0 | 1 | 0 | 0 | 1 | 697 | 1209 |
| 0 | 0 | 1 | 0 | 1 | 2 | 697 | 1336 |
| 0 | 0 | 1 | 1 | 0 | 3 | 697 | 1477 |
| 0 | 0 | 1 | 1 | 1 | A | 697 | 1633 |
| 0 | 1 | 0 | 0 | 0 | 4 | 770 | 1209 |
| 0 | 1 | 0 | 0 | 1 | 5 | 770 | 1336 |
| 0 | 1 | 0 | 1 | 0 | 6 | 770 | 1477 |
| 0 | 1 | 0 | 1 | 1 | B | 770 | 1633 |
| 0 | 1 | 1 | 0 | 0 | 7 | 852 | 1209 |
| 0 | 1 | 1 | 0 | 1 | 8 | 852 | 1336 |
| 0 | 1 | 1 | 1 | 0 | 9 | 852 | 1477 |
| 0 | 1 | 1 | 1 | 1 | C | 852 | 1633 |
| 1 | 0 | 0 | 0 | 0 | * | 941 | 1209 |
| 1 | 0 | 0 | 0 | 1 | 0 | 941 | 1336 |
| 1 | 0 | 0 | 1 | 0 | # | 941 | 1477 |
| 1 | 0 | 0 | 1 | 1 | D | 941 | 1633 |
| 1 | 0 | 1 | 0 | 0 | DIAL TONE | 350 | 440 |

TABLE I-continued

| TONE COMMAND | | | | | OPERATION | DUAL TONE FREQUENCIES | |
|---|---|---|---|---|---|---|---|
| | | | | | | LOW | HIGH |
| 1 | 0 | 1 | 0 | 1 | RING BK TONE | 440 | 480 |
| 1 | 0 | 1 | 1 | 0 | BUSY | 480 | 620 |

It is noted that the first two characters represent internal control commands, namely DOWN and UP, respectively, and are used to condition the system to an active or passive state. The remaining five bit tone characters all represent the dual frequency signals as specified corresponding to the digits 0 through 9, * and # keys on a standard pushbutton telephone handset, the A, B, C and D keys on a modified telephone pushbutton handset, and the dial tone, ringback tone and busy tones in a conventional telephone switchboard system. It should be noted that the paired tones are generally anharmonic and that other frequencies may be employed than those shown for the individual characters, if desired or required by the particular application of the invention. These frequencies may be harmonically or anharmonically related.

It is also noted that tone command register 31 is unresponsive to the DOWN and Up digital characters, while up/down command register 32 is responsive only to these characters.

The output of register 32 is coupled to the data input of an up/down decoder/latch unit 33 together with an enable signal from an enable latch 34 and an externally supplied signal designated $\overline{SYN}$, the latter being an externally generated control signal which enables manual resetting of the entire system. Enable latch 34 is set by an externally generated signal designated $\overline{ENX}$, which is an externally generated control signal indicating that the tone command on input bus 30 is a valid signal.

Figure 4:
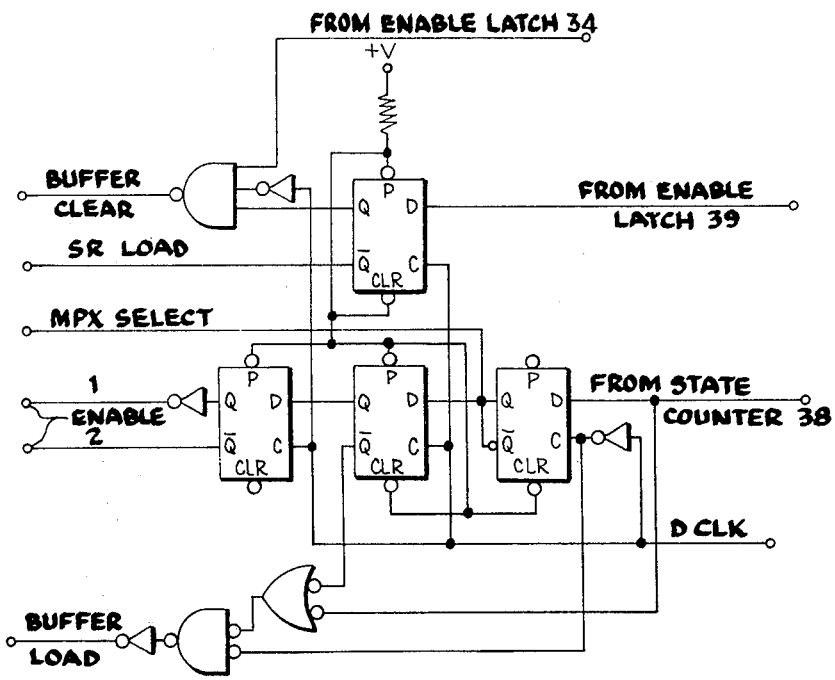
FIG. 4 is a logic diagram of control logic unit 39.

The enable output of enable latch 34 is also coupled to the load input of UP/DOWN command register 32 and tone command register 31 to enable loading of the tone command digital characters thereinto. Enable latch 34 is also coupled to the clear input of a scale of 12 state counter 38, and to a control logic unit 39 shown in detail in FIG. 4. The remaining input to the system is a synchronizing clock signal, termed D CLK, having a frequency of 4.6 MHZ which is coupled to an input of control logic unit 39 and the clock inputs of the elements specified below.

The output of tone command register 31 is coupled to a first portion (five bits) of the address input of a read-only memory 41, hereinafter designated ROM 41, requiring an eight bit address input character, Tone ROm 41 is preferably a 256×4 bit type 74S287 unit. The remaining three bits of the input to tone ROm 41 are supplied by state counter 38 and are used to designate particular bit pairs for readout in paired sequence in the manner described more fully below. As schematically depicted in FIG. 5, tone ROm 41 stores first and second sets of 10 bit characters A0-A9 and B0-B9 corresponding to predetermined low and high tones, respectively, and another set of 4 bit characters corresponding to different amplitude scales. In the preferred embodiment, the amplitude scales corresponding to gain factors 1–4 shown in FIG. 5 are −7.5, −5.5, −2.5 and −18.5 dBM respectively, while the amplitude factors for the dual frequency tone commands are as follows:

| OPERATION | LOW FREQUENCY | GAIN | HIGH FREQUENCY | GAIN |
|---|---|---|---|---|
| 1 | 697 | 0 | 1209 | 1 |
| 2 | 697 | 0 | 1336 | 1 |
| 3 | 697 | 0 | 1477 | 1 |
| A | 697 | 0 | 1633 | 1 |
| 4 | 770 | 0 | 1209 | 1 |
| 5 | 770 | 0 | 1336 | 1 |
| 6 | 770 | 0 | 1477 | 1 |
| B | 770 | 0 | 1633 | 1 |
| 7 | 852 | 0 | 1209 | 1 |
| 8 | 852 | 0 | 1336 | 1 |
| 9 | 852 | 0 | 1477 | 1 |
| C | 852 | 0 | 1633 | 1 |
| * | 941 | 0 | 1209 | 1 |
| 0 | 941 | 0 | 1336 | 1 |
| # | 941 | 0 | 1477 | 1 |
| D | 941 | 0 | 1633 | 1 |
| DIALTONE | 350 | 3 | 440 | 3 |
| R B T | 440 | 3 | 480 | 3 |
| BUSY | 480 | 3 | 620 | 3 |

The output of tone ROM 41, which is a four bit parallel digital character composed of two bits from set A and two bits from set B of the 10 bit character sets, is coupled to the input of a tone-shift register 43 via bus 42. The four bit gain characters are coupled to the input of an amplitude register 45 via bus 44. Both registers 43 and 45 are four bit parallel input registers of conventional design.

Loading of each four bit character from tone Rom 41 into tone-shift register 43 is accomplished by a LOAD signal generated by state counter 38 and coupled to register 43 via lead 48, while clocking of tone-shift register 43 for the purpose described below is accomplished by a clock signal generated by state counter 38 and coupled to register 43 via lead 39. The LOAD signal is generated by the stepping of state counter 38 to odd numbered states 1, 3, 5, 7 and 9 and the clock signals are generated by the stepping of state counter 38 to even numbered states.

Loading of each four bit gain character from tone ROM 41 into amplitude register 45 is accomplished by a LOAD signal generated by state counter 38 and coupled to register 48 via lead 46, the amplitude register load signal being generated once per system cycle by the stepping of state counter 38 to state 9.

The Ai and Bi single bit outputs of tone-shift register 43 are each coupled to a different input of a multiplier circuit generally designated by reference numeral 60 for the purpose described below. The 4 bit output of amplitude register 45 is coupled in two bit pairs to different inputs of the phase angle to amplitude converter 18 for the purpose described below.

The reference time generator 15 comprises an oscillator 52 which generates a high-frequency clock output signal preferably having frequency of 8.3886 MHZ which is coupled to the input of a scale of 256 divider circuit 53. The output of divider 53, which comprises a 32.768 KHZ signal, is coupled to the data input of a 16 bit counter 54, the output of which is a 16 bit digital character specifying a fractional period of time. The output of up/down decoder/latch 33 is coupled to the clear inputs of divider 53 and 16 bit counter 54 in order to reset both of these elements upon receipt of a special command not used in the normal operation of the system. The D CLK signal is input to divider 53 to sychronize the operation of this element with other system components.

The output of counter 54 is coupled to the input of a 16 bit shift register 61 of multiplier circuit 60. The load command to shift register 61 is obtained from control logic 39 and corresponds substantially to the zero state of state counter 38. The shift clock input to register 61 comprises the D CLK signal. The 12 most significant bits in register 61 are coupled in parallel to the first summing inputs of a pair of conventional 12 bit binary adders 62, 63. The output of each of the adders 62, 63 is coupled to the input of a different one of a pair of 12 bit buffer registers 65, 66. The clear inputs of buffers 65, 66 are coupled to an output control signal from control logic 39 termed BUFFER CLEAR, which is generated when state counter 38 is stepped to the zero state. The clock inputs to buffer registers 65, 66 are respectively the A0–A9 and B0–B9 bits output from tone/shift register 43. The 12 bit outputs of the buffer registers 65, 66 are each coupled in parallel to the remaining inputs of adders 62, 63, respectively.

The six most significant bits of the outputs of buffer registers 65, 66 are further coupled to separate inputs of a conventional multiplexer 70, preferably a pair of type 74157 units, forming the input to the phase angle to amplitude converter 18, together with the paired two bit amplitude codes from amplitude register 45, thus providing two 8 bit parallel input characters. The control input signal to multiplexer 70 termed MPX SELECT is obtained from control logic unit 39 and corresponds substantially to states 11 and 12 of the system. The output of multiplexer 70, which comprises the first product from buffer register 65 during state 11 together with the corresponding two bit gain character and the second product from buffer register 66 together with the corresponding two bit gain character during state 12, is coupled to the address input of a sine table read-only memory 72 in which a plurality of sets of 12 bit amplitude codes are stored, each set having a different compression scale. In the preferred embodiment, ROM 72 comprises two 256×4 bit tupe 74S287 units and four sets of amplitude codes are stored in ROM 72. Each set has a total of 64 different phase angles, the four sets representing amplitudes with the amplitude scales noted above. Thus, the eight bit address character input to ROM 72 comprises a six bit portion obtained from one of the buffer registers 65, 66 and specifying the most significant bits of the output from the designated register and a two bit portion specifying that particular one of the four amplitude character sets which is to be read out. In addition, the most significant bit of the eight bit output character from multiplexer 70 is also used to specify the sign of the output character from ROM 72 and for this purpose by-passes the ROM 72 completely. In the preferred embodiment the sign convention employed comprises a zero bit to specify positive amplitude (phase angles up to 180°) and a one bit to specify a negative amplitude (phase angles in the range from 180° to 360°).

Figure 6:
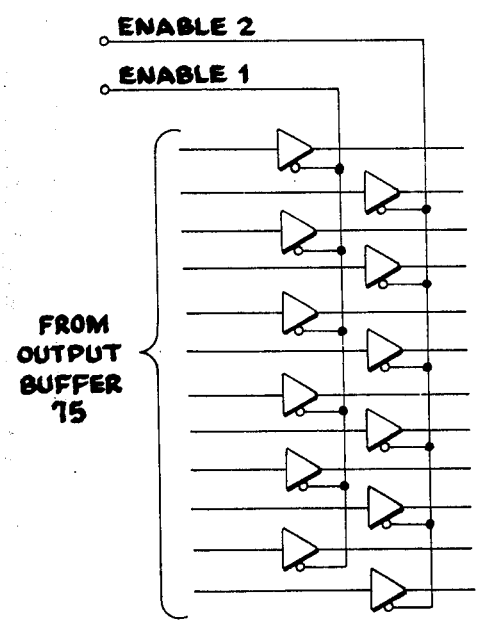
FIG. 6 is a logic diagram of data output gating unit 78.

The output of ROM 72 is coupled to a first input of a 12 bit adder 74, the output from which is coupled in parallel to the input of an output buffer register 75. The output of buffer register 75 is coupled back to the remaining data input of adder 74 and is also presented to the input of a data output gating unit 78 shown in FIG. 6. The CLEAR and LOAD inputs to register 75 are obtained respectively from state counter 38 and control logic unit 39, the CLEAR command being present during states 4-7 of counter 38, the LOAD command being present during states 11 and 12 of the system.

The state 11 output of counter 38 is also coupled to a reset input of enable latch 34 and to the input of control logic 39 to enable generation of the MPX SELECT control signal.

A signal designated ENABLE OUTPUT is coupled from control logic unit 39 to the data output gating unit 78 to enable output of data from output buffer register 75 after state counter 38 is stepped from state 11 to state 0. The output of data output gating unit 78 comprises the composite 12 bit digital dual frequency amplitude character which is coupled via output bus 80 to utilization circuitry.

SYSTEM OPERATION

Figure 7:
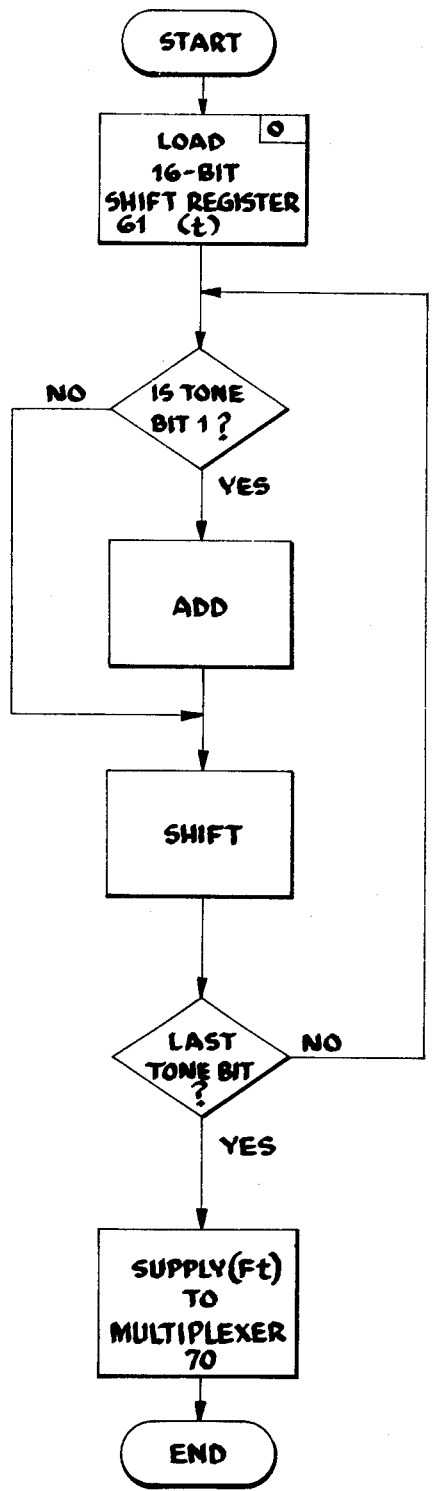
FIG. 7 is a flow chart illustrating the multiplication operation.

As noted above, successive portions of a digitized version of a dual tone frequency analog signal are generated according to the invention by first multiplying a fractional time period by first and second frequencies, weighting the individual products obtained by two bit amplitude codes, performing a table lookup for each of the two products, and adding together the weighted amplitude codes output from the sine table ROM 72. Multiplication is accomplished by the conventional process of straight binary multiplication, also termed multiplication using a shifting adder which is illustrated in the flow chart shown in FIG. 7 for one of the two independent multiplier sections. Thus, beginning with start, during state zero the 16 bit character representing the fractional time character is loaded from counter 54 into shift register 61. Thereafter, during states 1–9 of state counter 38 each successive $A_i$, $B_i$ tone bit output in pairs from tone-shift register 43 is tested to determine whether the current contents of shift register 61 are to be added to the current contents of buffer registers 65, 66, respectively. If the tone bit is a one, the partial products are stored in buffer registers 65, 66, respectively, and the contents of shift register 61 and tone shift register 43 are shifted by one order and added to the partial products until the last pair $A_9$, $B_9$ of tone bits has been so tested.

Thereafter, the outputs of the buffer register 65, 66 representing the complete products are supplied to multiplexer 70.

FIGS. 8A–8E illustrate the manner in which the tone characters are read/out from the tone ROM 41 during states 1–10 of state counter 38. In each FIG., two successive states are represented, the odd numbered state illustrating the result of the appearance of the load signal at the input to tone shift register 43, the even numbered state indicating the shifted contents of the tone-shift register 43 after the appearance of the clock signal. Thus, in state 1 the first two bits A0, A1 of tone character A, representing the first frequency of the tone command, and the first two bits B0, B1 of the tone character B, representing the second frequency specified by the tone command, are loaded into tone shift-register 43 in the manner indicated. The A0 and B0 bits output from tone shift register 43 are coupled to the clock input of buffer register 65, 66, respectively, and used in the first multiplication step. When counter 38 is incremented to state two by D CLK, the contents of tone-shift register 43 are shifted one order to the right as shown and the A1, B1 bits are readout from register 43 to the buffer registers 65, 66. When counter 38 is incremented to state three by D CLK, the next succeeding pair of bits from tone characters A and B, viz. A2, A3, and B2, B3, are loaded into tone shift register 43 and the lower order ones A2, B2 of each pair of bits is read out to the buffer registers 65, 66. Similarly, when counter 38 is incremented to state four, the contents of register 43 are shifted one order to the right and bits A3, B3 are read out. This process continues until all of the ten bits from each of the two tone characters have been so loaded into tone-shift register 43 and shifted, a process which ends at state 10. It should be noted that during state 9 the four compression character bits are loaded from tone ROM 41 into the amplitude register 45.

Detailed system operation proceeds as follows:

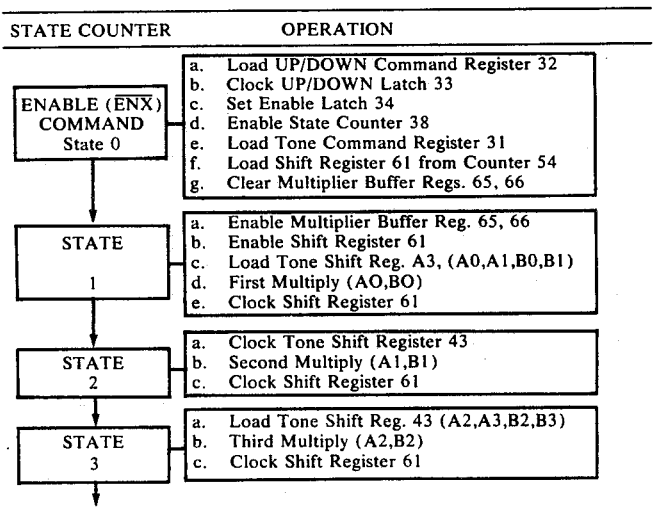

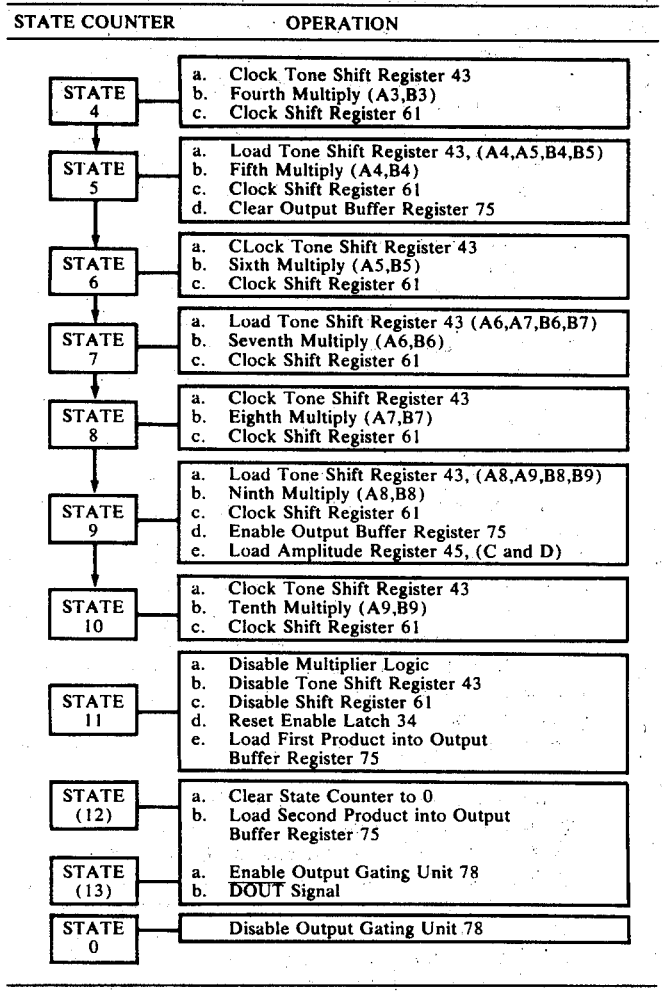

As noted above, state counter 38 is a scale of 12 counter which is reset from 11 to 0 at the end of a system cycle. The two additional system states, viz., state 12 and 13 are provided by control logic unit 39 clocked by D CLK signal. This arrangement enables the system to respond to a subsequently received additional tone command character and $\overline{ENX}$ control signal while the computed output character in output buffer register 75 is still being output by data output gating unit 78 to output bus 80. Where this functional capability is not required, this feature may be eliminated if desired.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A method of generating a multi-bit digital representation of an analog signal having two frequency components, said method comprising the steps of:
   a. generating a first multi-bit digital signal representative of said analog signal;
   b. generating a second multi-bit digital signal representative of a fractional portion of a standard time interval;
   c. multiplying said first digital signal by said second digital signal to form a pair of multi-bit digital product signals each representative of the phase of a different one of said two frequency components relative to said standard time interval;
   d. converting each of said digital product signals to a multi-bit digital amplitude signal; and
   e. summing the multi-bit digital amplitude signals resulting from step (d) to produce a single multi-bit digital amplitude signal.

2. The method of claim 1 wherein said step (a) of generating includes the steps of:
   i. providing a plurality of stored multi-bit characters each representative of a different dual frequency signal, said characters being stored in a first memory;
   ii. supplying a multi-bit input character to the input of said first memory;
   iii. reading one of said stored multi-bit characters in response to the receipt of said input character.

3. The method of claim 2 wherein said step (i) of providing includes the step of arranging each of said stored multi-bit characters in first and second bit strings corresponding to first and second ones of said two-frequency components, and wherein said step of (iii) reading includes the steps of serially reading said first and second bit strings in bit-by-bit parallel fashion.

4. The method of claim 1 wherein said step (b) of generating includes the step of generating successive multi-bit characters representative of successive predetermined fractional intervals of said standard time interval.

5. The method of claim 1 wherein said first and second digital signals each comprises a multi-bit digital character, and said step (c) of multiplying comprises straight binary multiplication.

6. The method of claim 1 wherein said step (d) of converting comprises the steps of:
  iv. providing at least one set of stored multi-bit amplitude characters each representative of the amplitude of an analog signal with a different phase angle, said amplitude characters being stored in a second memory;
  v. supplying said pair of digital product signals to the input of said second memory;
  vi. reding one of said stored multi-bit amplitude characters from said second memory in response to the receipt of said pair of digital product signals.

7. The method of claim 6 wherein said step (a) of generating includes the step of providing a multi-bit digital gain character representative of at least one predetermined amplitude factor, and wherein said step (d) of converting further includes the step of coupling said second memory to enable reading of said one of said stored multi-bit amplitude characters from a selected one of said at least one set.

8. For use in an electronic communication system, apparatus for generating a multi-bit digital representation of an analog signal having two frequency components, said apparatus comprising:
  means for generating a first multi-bit digital signal representative of said analog signal;
  means for generating a second multi-bit digital signal representative of a fractional portion of a standard time interval;
  means for multiplying said first digital signal by said second digital signal to form a pair of multi-bit digital product signals each representative of the phase of a different one of said two frequency components relative to said standard time interval;
  means for converting each of said digital product signals to a multi-bit digital amplitude signal; and
  means for summing the multi-bit digital amplitude signals to produce a single multi-bit amplitude signal.

9. The combination of claim 8 wherein said first generating means includes a first memory means for storing a plurality of multi-bit characters each representative of a different dual frequency signal, said first memory means having an input adapted to receive a multi-bit input character from an external source and output means for manifesting one of said stored multi-bit characters in response to the receipt of one of said input characters.

10. The combination of claim 9 wherein each of said stored multi-bit characters in said first memory are arranged in first and second bit streams corresponding to first and second ones of said two frequency components and wherein said first memory further includes means for serially manifesting said first and second bit streams in bit-by-bit parallel fashion.

11. The combination of claim 8 wherein said second generating means includes means for generating successive multi-bit characters representative of successive predetermined fractional intervals of said standard time interval.

12. The combination of claim 8 wherein said converting means includes second memory means for storing at least one set of multi-bit amplitude characters each representative of the amplitude of an analog signal with a different phase angle, said second memory means including input means coupled to the output of said multiplying means and output means for manifesting one of said stored multi-bit amplitude characters in response to the receipt of a pair of digital product signals from said multiplying means.

* * * * *